United States Patent [19]
Devoe

[11] Patent Number: 5,793,091
[45] Date of Patent: Aug. 11, 1998

[54] PARALLEL ARCHITECTURE FOR QUANTUM COMPUTERS USING ION TRAP ARRAYS

[75] Inventor: Ralph Godwin Devoe, Palo Alto, Calif.

[73] Assignee: International Business Machines Corporation

[21] Appl. No.: 768,019

[22] Filed: Dec. 13, 1996

[51] Int. Cl.$^6$ ........................ H01L 31/00; H01L 29/205
[52] U.S. Cl. ........................ 257/432; 257/17; 257/21
[58] Field of Search .............................. 257/21, 17, 432

[56] References Cited

U.S. PATENT DOCUMENTS 5,530,263  6/1996  DiVincenzo ............................ 257/14
5,608,229  3/1997  Mukai .

OTHER PUBLICATIONS

A. Barenco et al., "Conditional Quantum Dynamics and Logic Gates", *Physical Review Letters*, vol. 74, No. 20 May 15, 1995, pp. 4083–4086.
C.H. Bennett, "Quantum Information and Computation", *Physics Today*, Oct. 1995, pp. 24–30.
J. I. Cirac et al., "Quantum Computations with Cold Trapped Ions", *Physical Review Letters*, vol. 74, No. 20, May 15, 1995, pp. 4091–4094.
D.P. DiVincenzo, "Quantum Computation", *Science*, vol. 270, Oct. 13, 1995, pp. 255–261.
A. Ekert et al., "Quantum Computation and Shor's Factoring Algorithm", *Reviews of Modern Physics*, vol. 68, No. 3, Jul. 1996, pp. 733–753.
J. Glanz, "A Quantum Leap for Computers? ", *Science*, vol. 269, Jul. 7, 1995, pp. 28–29.
C. Monroe et al., "Demonstration of a Fundamental Quantum Logic Gate", *Physical Review Letters*, vol. 75, No. 25, Dec. 18, 1995, pp. 4714–4717.
C. Monroe et al., "A Schrödinger Cat' Superposition State of an Atom", *Science*, vol. 272, May 24, 1996, pp. 1131–1136.
T. Pellizzari et al., "Decoherence, Continouous Observation, and Quantum Computing: A Cavity QED Model", *Physical Review Letters*, vol. 75, No. 21, Nov. 20, 1995, pp. 3788–3791.
P.W. Shor, "Algorithms for Quantum Computation: Discrete Logarithms and Factoring", *Proceedings of the 35th Annual Symposium on Foundations of Computer Science*, Santa Fe, New Mexico, Nov. 20–22, 1994, pp. 124–134.

*Primary Examiner*—Jerome Jackson
*Attorney, Agent, or Firm*—James C. Pintner; R. Bruce Brodie

[57] ABSTRACT

A parallel architecture of quantum logic gates and quantum communication channels is provided for a quantum computer, thereby achieving advantageous efficiency and computation speed. The architecture of the invention enables parallel memory operations on large quantum words, and permits the application, to the quantum case, of parallel algorithms for mathematical operations such as addition and multiplication. The invention also includes a novel apparatus for realizing parallel architecture using an array of miniature elliptical ion traps, with as many traps as there are bits in a quantum word. The ion trap array preferably uses an elliptical planar geometry, which can microfabricated by photolithography. Quantum information is transferred from one ion trap to another by either an optical coupling via a high finesse resonant cavity (photon coupling) or by electrostatic coupling of the ions' mechanical motion (phonon coupling).

13 Claims, 9 Drawing Sheets

PARALLEL ARCHITECTURE FOR QUANTUM COMPUTERS USING ION TRAP ARRAYS

FIELD OF THE INVENTION

The invention generally relates to the fields of (i) quantum computers, (ii) physical devices which trap ions in electrodynamic potential wells. More specifically, the invention relates to the interrelationship between these two fields, for the use of such trapped ions for quantum logic operations and quantum computation. The invention has particular applicability to computer architecture.

BACKGROUND OF THE INVENTION

This invention relates to quantum computation, a new field which combines ideas from computer science, quantum mechanics, and atomic physics to create a qualitatively new kind of computing device. The invention also relates to ion traps and ion trap arrays as a means of realizing a quantum computer.

Quantum computation has recently become an important area of research that combines ideas in computer science, quantum mechanics, and atomic physics. Computers based on quantum mechanical principles are predicted to be 10 to 20 orders of magnitude more powerful than any classical machine and thereby solve problems which at present are too complex for numerical solution.

Many current computers utilize devices such as transistors which rely on quantum mechanics for their operation. However, such computers must be called "classical" in the present context, since each logic gate yields a voltage or current which can be measured by a ordinary voltmeter.

Quantum computers, on the other hand, employ quantum logic gates which can output superposition states of logical "1" and "0", which cannot be measured directly, due to Heisenberg's uncertainty principle. Quantum computers gain their advantage over conventional silicon computers due to an intrinsic quantum phenomenon first recognized by Deutsch (Proc. R. Soc. Lond. A400, 97, 1985) called "quantum parallelism". This phenomenon rests on the ability of quantum superposition states to represent many different numbers simultaneously.

It is important to distinguish this "quantum parallelism", which is common to all quantum computers from the "architectural parallelism" which is the subject of this invention, as will be discussed in more detail below.

In 1994 Peter Shor invented an algorithm which uses quantum parallelism to factor large integers exponentially faster than any classical machine. This theoretical discovery has had important practical applications, since the security of RSA public key cryptographic systems (see U.S. Pat. No. 4,405,829, Rivest et al., "Cryptographic Communications System and Method") rests on the assumption that large enough integers can never be factored in practice.

Shor's algorithm stimulated experimental work, by showing that there was at least one important problem that was solvable by a specific quantum mechanical procedure that had no classical counterpart. Moreover, practical quantum computers would threaten much current Internet commerce, which commonly uses an RSA public key cryptographic system.

Discussion of quantum computing began in the early 1980's with papers by Richard Feynman (Found. Phys. 16, 507, 1986) and Deutsch. Given the historical exponential increase in circuit density with time, Feynman realized that, in the not-too-distant future, microelectronic devices would in principle shrink to atomic dimensions, so that their quantum mechanical features would become important.

Quantum computation is an attempt to exploit this regime, by assuming that each logical element is an ideal quantum system, unperturbed by the environment. In 1985, Deutsch developed a model of an idealized quantum computer called a quantum Turing machine, based on this assumption. However, until Shor's algorithm in 1994, no specific problem was known which was uniquely solvable by quantum techniques.

The ideal quantum systems assumed by theorists do not exist in ordinary electronic devices, which typically have negligible quantum lifetimes. Practical quantum computing devices have therefore been sought primarily in single atoms which are isolated from the outside world and kept at extremely low temperatures.

The most widely discussed model is that of Cirac and Zoller (Phys. Rev. Lett. 74, 4091, 1995) who showed how to use laser-cooled trapped ions as quantum logic and memory devices. In an ion trap, individual atoms are suspended by electromagnetic forces in a ultra-high vacuum, where they are almost completely decoupled from their environment.

The general principles underlying ion trap operation have been described in the literature and in U.S. Pat. Nos. 5,248,883 and in 5,379,000. Trapped ions have been laser-cooled to temperatures below 1 microkelvin, where they are essentially stationary, occupying the quantum mechanical ground state of the trap. Such systems have been shown to have quantum lifetimes, of minutes or longer, which are necessary for quantum computation.

Recently, Monroe et. al. (Phys. Rev. Lett. 75, 4714, 1995) have used a trapped single ion to construct the first working quantum logic gate. Preskill et. al. (Phys. Rev. A54, 1034, 1996) have worked out the complete set of quantum programming instructions required to evaluate Shor's algorithm in the Cirac-Zoller model. Three groups are currently engaged in building prototype ion trap quantum CPU's (central processing units) to evaluate Shor's algorithm for a small number of bits.

It is important to note that many other physical systems have been proposed for quantum logic, for example, nuclear spins in solids, interacting quantum dots (DiVincenzo, U.S. Pat. No. 5,530,263) , and photons confined in a optical cavity. The photon model has even been tested in an experiment by Kimble et. al. (Phys. Rev. Lett. 75, 4710, 1995). However, all systems other than the Cirac-Zoller model are far from practical use, even in prototype form, and no analysis has been made of how to combine them into a CPU.

The Cirac-Zoller Quantum Computer

To understand how the present invention overcomes some of the limitations of the Cirac-Zoller ion trap quantum computer, it is necessary to describe that prior art quantum computer in detail.

Figure 1:
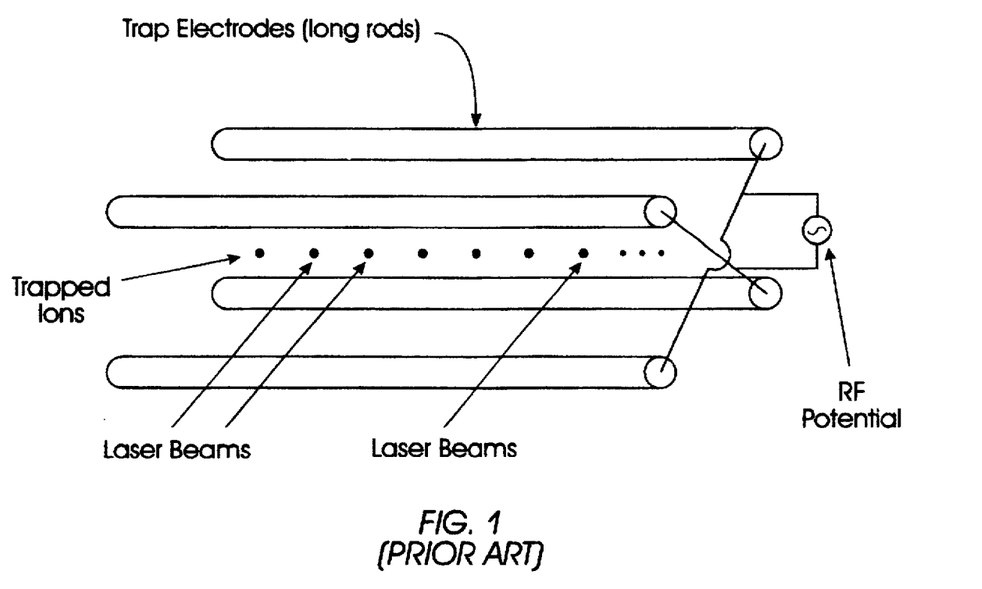
FIG. 1 shows the standard model of a linear ion trap quantum computer as described by Cirac and Zoller.

FIG. 1 shows the Cirac-Zoller computer, which consists of a linear ion trap containing a row of laser-cooled trapped ions, each of which can be excited by a laser beam. The details of the linear ion trap and laser cooling will be described below.

Each trapped ion contains long-lived internal energy levels, which can be used for logic and for storage of a single quantum bit, called a "qubit". A qubit differs from a classical bit in that it can be in a superposition state of logical "1" and "0". By contrast, a classical bit must either be a "0" or a "1", and cannot be both at the same time.

Figure 2:
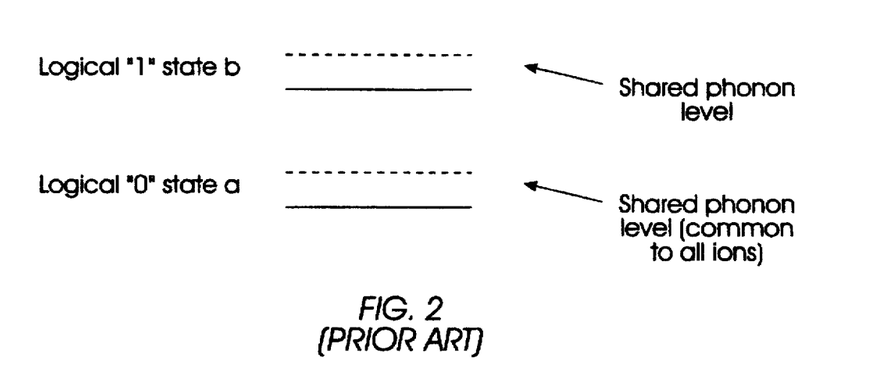
FIG. 2 shows the energy levels of a single ion in a trap including the internal atomic energy levels a and b and the levels of the trap phonon.

FIG. 2 shows an energy level diagram of a two-level system, typically a pair of ground state hyperfine levels, in which the ground state "a" represents a logical 0 and the excited state "b" represents a logical 1.

It is well known in quantum mechanics that atoms can exist in superposition states, in which the atom is in simultaneously in state "a" with probability c(a)*c(a) and in state "b" with probability c(b)*c(b), where c is Schroedinger's wave function for the system. Thus each quantum bit can represent two numbers at once, and N qubits can represent $2^N$ numbers simultaneously. This is a unique feature of quantum mechanics, which permits exponentially large arrays of numbers to be processed at the same instant, in contrast to a classical CPU which can only process one number at a time.

Figure 3:
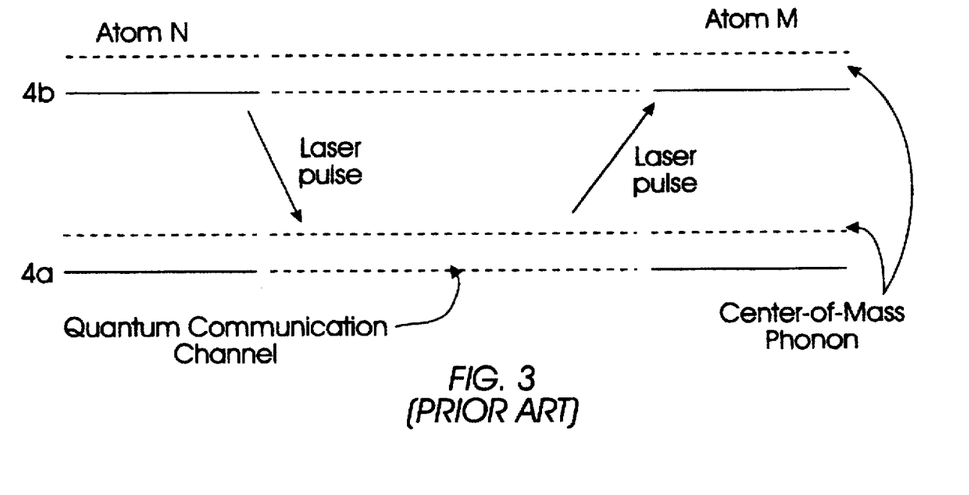
FIG. 3 shows the transmission of quantum information from one atom to another using the shared c.m. phonon as a quantum communication channel.

To be useful for quantum computation, trapped atoms must not only store qubits, but also must transmit quantum information from one atom to another and must perform logical operations such as AND and OR on qubits stored in different atoms. In the Cirac-Zoller model, this is performed by a second type of quantum system called the center-of-mass phonon, which is shared by all the ions and which serves as a quantum communications channel, as shown in FIG. 3.

The center-of-mass phonon, abbreviated "c.m." phonon, represents a mechanical vibration of the entire ion crystal in the trap potential. Cirac and Zoller (Phys. Rev. Lett. 74, 4091, 1995) showed how a laser pulse, applied, for example, to the N-th ion, could transfer the wavefunction of that ion's internal levels to the first two c.m. phonon levels. Another laser pulse, applied to the M-th ion, can then write the wavefunction out of the c.m. phonon into the internal levels of the M-th atom. The net result is that the wavefunction of atom N has been transferred to atom M, achieving the goal of quantum communication. A similar process can be used to form an fundamental quantum logic gate, the exclusive OR gate, as is described in the literature.

Several limitations exist, both in the overall organization or architecture of the Cirac-Zoller quantum computer, and in the specific physical properties of the ion trap.

The architectural limitation consists of the use of only one quantum communication channel, the c.m. phonon, to carry all the information between each quantum bit (e.g. ion) in the array. This is a serial architecture, since all the operations on each bit must proceed in order one after the other through the c.m. phonon.

Figure 4:
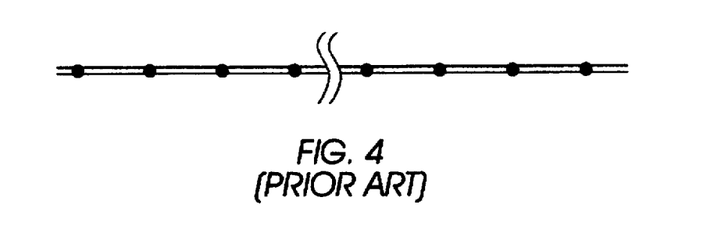
FIG. 4 shows a schematic diagram of the serial architecture of the standard ion trap model, the Cirac-Zoller model.

FIG. 4 shows a schematic drawing of the serial architecture of Cirac and Zoller, in which a solid double line represents the quantum communication channel (a shared quantum system, e.g., a trap phonon) and each of the large dots represents a single quantum logic or memory element, (e.g. a single trapped ion).

Shor's algorithm requires repeated arithmetic operations on numbers several hundred bits long, so that use of the architecture of FIG. 4 results in a severe penalty in execution time and efficiency. For example, to add two 100-bit numbers in this architecture requires 100 separate bit-by-bit additions, each occurring one after the other over the same quantum channel. This is in contrast to conventional silicon computers which use parallel architecture where many bits are added simultaneously and algorithms are used to compute carry bits.

A detailed examination of the specific operations required by Shor's algorithm shows that the limitation of a serial architecture is even more severe than indicated above. Preskill (Phys. Rev. A54, 1034, 1996) has tabulated all the operations required and shown that an calculation on a K bit number requires 5K+1 ions and approximately $K^2$ separate K-bit additions. The extra qubits are required, to allow for overflow and to provide temporary registers to store intermediate results. A K=200 bit word therefore implies that the trap must contain over 1000 ions, all communicating over a single quantum channel. This requires over $10^9$ operations on the c.m. phonon to carry out. This puts a severe burden on the technology.

Optimization of the architecture for a quantum computer raises new questions that have not been considered for conventional computers. This is because, in a conventional computer, the communications channel can be an ordinary copper wire or a trace on a printed circuit board. It is usually the lowest technology, and the cheapest part of the computer. In a quantum computer, on the other hand, the quantum communications channel is the most difficult and the most high-technology part of the device.

Effective quantum channels have only been demonstrated in the last few years. Only two types have been tested experimentally, the vibrational phonons associated with laser-cooled ion traps (Phys. Rev. Lett.75, 4714, 1995) and photons coupled to single atoms in optical cavities ( Phys. Rev. Lett. 75, 4710,1995).

Moreover, a quantum channel must be kept free from interaction with the environment. Such interaction tends to destroy the pure quantum states necessary for computation and limit the power of the computer. Only in the last few years, for example, have the necessary laser cooling techniques (Raman cooling, Phys. Rev. Lett. 75, 4011, 1995) been developed. Hence, architectural questions in quantum computers that is, the arrangement of the logic, the memory, and the communications channel, raise complex questions of physics. The optimum architecture may also differ because of the different economics and efficiency of the quantum logic, memory, and communications.

A general reason why a serial architecture has conventionally been chosen is that linear ion traps are very difficult to construct and to operate. This is because each quantum channel requires a separate ion trap. Use of only one trap forces a serial architecture.

Linear Ion Traps

Other limitations in quantum computer architecture also arise from the detailed physical properties of linear ion traps.

Linear ion traps were first proposed by Prestage et. al. (J. Appl. Phys. 66, 1013, 1989), and their design has been discussed in the literature (Phys. Rev. A45, 6493, 1992). A conventional linear ion trap consists of four electrodes in the shape of long rods of circular cross section.

A radio frequency potential of a certain frequency is applied between opposite pairs of electrodes, as shown in FIG. 1, creating an effective transverse potential well which confines the ions in a state of dynamic equilibrium as discussed in U.S. Pat. Nos. 5,248,883 and 5,379,000. The radio frequency field provides little or no confinement along the z-axis. Instead, a weak D.C. field is applied through two endcap electrodes. The weak confinement along the z-axis makes it energetically favorable for laser-cooled ions to condense in a long row on the z-axis.

With appropriate laser cooling the ions can be held in an essentially stationary array, essentially as a linear ion crystal, for many hours. The advantage of a linear ion trap, compared to the usual 3-dimensional trap, is that an arbitrarily large number of ions may be stored along the z-axis by extending the length of the rods as needed. These ions can then be laser-cooled to near the quantum mechanical ground state, since they are free from micromotion, as discussed in the literature.

Linear ion traps, however, also have limitations as to their usability for quantum computer architecture.

The first limitation resulting from the use of a linear ion trap is that the traps have a complex 3-dimensional structure, which is difficult to fabricate in the required miniature size. Miniaturization is desirable because the smaller the trap, the faster the quantum computer can operate. This is because the computer can operate no faster than the frequency of vibrational phonon, and the phonon frequency is proportional to the trap electric field , which is inversely proportional to the dimensions of the trap electrodes. The smaller the trap, the higher the field, the strong the trap force, the higher the phonon frequency, and the faster the computer clock can operate.

Current linear ion traps are machined at the limits of conventional technology, with rods several hundred microns in diameter. This leads to single ion oscillation frequencies of 10–100 kHz.

A second limitation of a linear ion trap is that the c.m. phonon frequency, and thereby the computer speed, drops as the number of trapped ions increases. The phonon frequency obeys the simple harmonic oscillator relation $\sqrt{k/M}$ where k is the spring constant and M the mass of all the ions. The large number of ions required for quantum computation (1000 to 10,000) therefore means the c.m. phonon frequencies will be about 30 times smaller than for a single ion. Consequently, the computer will operate that much more slowly.

A third limitation is that the construction of the linear ion trap is not modular. That is, since the c.m. phonon frequency depends on the number of ions in the trap, the basic operating parameters of the computer vary as more ions are added. The behavior of a large computer containing 1000 trapped ions is difficult to predict experimentally, and cannot be directly inferred from the properties of a small device. The maximum number of ions trapped to date is about 30.

Finally, the limitations of architecture and of linear trap physics work against each other and provide an upper limit of the size of a number to be factored. With a serial architecture, the number of additions goes up like $K^2$, while the computer speed goes down like $\sqrt{K}$, for a given level of technology.

Figure 5:
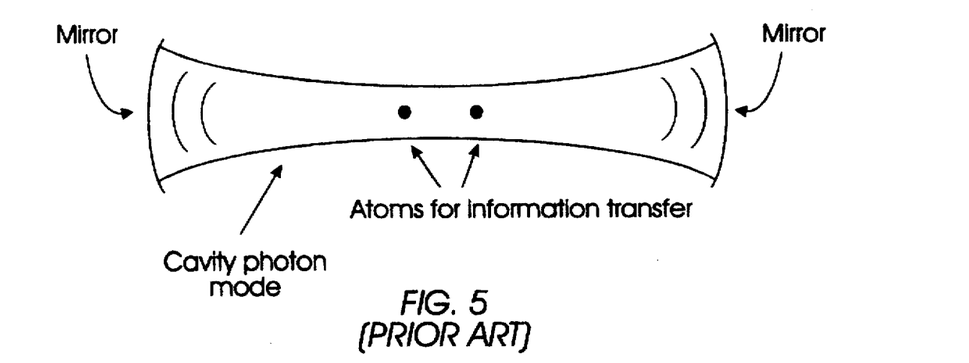
FIG. 5 shows an a quantum communications channel using cavity photons.

In addition to use of the c.m. phonon as a quantum communication channel, Zoller et. al. (Phys. Rev. Lett. 75, 3788, 1995) have also shown that photons in an optical cavity can form a quantum communications channel, as shown in FIG. 5.

Figure 6:
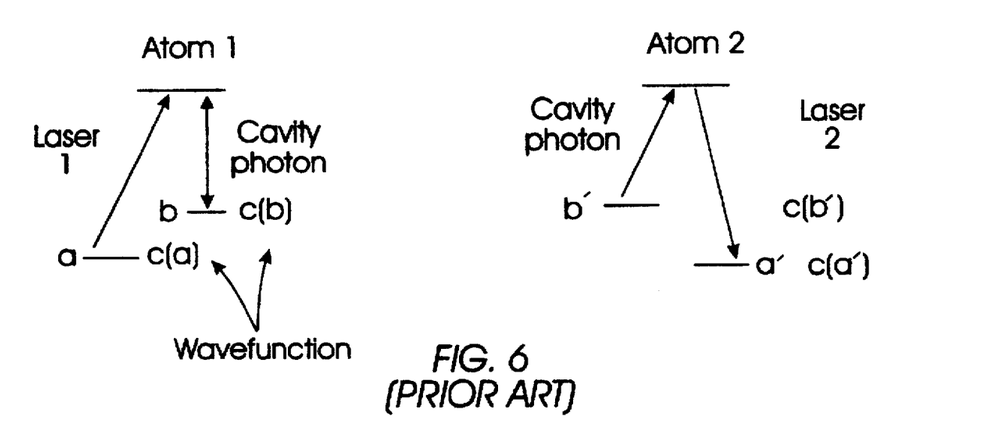
FIG. 6 shows the energy levels of two atoms exchanging quantum information by a cavity photon communications channel.

An optical mode of the cavity resonant with transitions of atoms A and B is used as a quantum communication channel, as shown in FIG. 6.

The atoms contain a 3-level structure in which the ground state is split into two sublevels which store the quantum information. The two sublevels correspond with the wavefunction c(a) and c(b). One of the two transitions of each atom is driven by an external laser, while the other is resonant with the cavity photon. Information is transferred between a given two atoms by illuminating these two atoms with pulsed laser beams, the beams having a complex overlapping pulse shape.

In such a channel, the wavefunction is transferred from one atom to another in the same cavity, using a method called "adiabatic passage via a dark state of the 2-atom cavity system". This mechanism is inherently quantum mechanical, and rests on previous work in cavity quantum electrodynamics ( "Cavity Quantum Electrodynamics", P. Berman, Acad. Press, 1993) and adiabatic passage (Parkins et. al., Phys. Rev. Lett. 71, 3095, 1993).

The net result is that the wavefunction is transferred from one atom to another with high efficiency. The use of a "dark state" means that the cavity photon is "virtual" so that the effect of spontaneous emission is greatly reduced. The design of quantum computers using cavity photons is far behind that of ion trap computers, and no detailed designs have been reported.

In summary, existing technology for producing quantum computers using trapped ions has had the following drawbacks: First, conventional quantum computers use only one quantum channel, and thus require a serial architecture which limits computer speed. Second, they use a linear ion trap, which is difficult and expensive to construct in the required miniature size. Third, they put a large number of ions in the same trap, which lowers the phonon frequency and the compute speed. Fourth, they are not modular in architecture, so that adding bits in the computer requires a redesign of all the computer parameters. These limitations have been found to be so severe that they threaten the practicality of the Cirac-Zoller quantum computer.

Therefore, there is a need for a quantum computer technology which overcomes these drawbacks.

SUMMARY OF THE INVENTION

It is therefore the object of this invention to provide an apparatus and method of organization of quantum computers, using a parallel architecture, to increase the speed and efficiency of computation.

It is a further object of the invention to efficiently and economically realize this parallel architecture through the manufacture of ion trap arrays which are simple both in design and construction.

Specifically, an object of the present invention is to provide four parallel architectures for optimizing the performance of quantum computers. By "architecture," we mean a specific set of relations between quantum logic, memory, and communications channels. Quantum architectures are different from those of conventional computers (e.g. silicon microprocessors) because of the different physics, technology, and economic value placed on logic, memory, and communications channels in the two cases.

The new quantum architectures described in this invention use many "small" quantum channels for frequently performed logic and memory operations and a few "large" channels for infrequently performed operations. By a "small" channel we mean a channel that connects a small number of quantum bits, for example, 2 to 20. The small channels operate in parallel, so that an entire N-bit quantum word can be written from one location to another in a single operation. The small channels also permit the use of algorithms to increase the speed of elementary mathematical operations such addition and multiplication. This represents a basic improvement over the serial Cirac-Zoller architecture of the prior art. Another advantage is that the small channels have faster intrinsic operation times and lower error rates due to their physics.

Additionally, it is another object of this invention to provide a method of constructing parallel quantum computers using ion trap arrays, where each small quantum channel is physically realized by an ion trap of a novel design. This invention therefore replaces one large linear trap, which typically might contain several thousand ions, with an array of several hundred small traps each containing a few ions. This overcomes several limitations of prior art which were discussed above.

First, each trap contains its own c.m. phonon so that there are now many quantum communication channels, for example, one channel per quantum bit. The trap array thus constitutes a parallel architecture, as noted above. Second, each trap now contains only a few ions, so that the c.m. phonon frequency remains high, further enhancing the computer speed, in a typical case by a factor of 20. Third, each trap can now be physically small, which increases the phonon frequency and, therefore, the computer clock speed.

Furthermore, it is another object of this invention to provide a method of constructing planar traps using a new elliptical geometry specifically designed for quantum computation and not taught in the previous planar trap U.S. Pat. Nos. 5,248,883 and 5,379,000. These elliptical traps have the same function as a linear ion trap, to confine a row of ions for use as quantum bits, but are simpler in design and construction so that they may be microfabricated by photolithography.

By using mass production methods common in the integrated circuit industry, it is intended that the manufacture an entire array of several hundred traps would be more economical and efficient than the construction by hand of a single linear ion trap.

To achieve these objects, parallel architecture for quantum computers and its realization by arrays of elliptical planar ion traps are described and claimed below. Specifically we provide four basic preferred architectures for quantum computers. The four architectures are designated the nearest-neighbor model, quantum bus model, a model which combines both, and a 2-dimensional array model.

At present, several physical implementations of quantum computer elements have been proposed. Any of them may be used to implement the architectures of the invention.

In particular, one preferred form of a quantum computer element is an ion trap. The four quantum computer architectures are preferably implemented, as ion traps, as per any of eight basic configurations of elliptical planar ion trap which are taught in U.S. Pat. No. 5,248,883.

DESCRIPTION OF THE PREFERRED EMBODIMENT

Quantum computers require new architectures because the physics and technology of the quantum logic, memory, and communication channels are entirely different from those of conventional silicon computers. The design of the architectures in particular is driven by the need to overcome the limitations of the quantum communications channels, which are the most difficult and critical part of a quantum computer. The most important limitation in the quantum case is that the computation rate of the entire computer is limited by the data transmission rate of the quantum channels. Furthermore, the quantum channel speed drops rapidly as the number of logic and memory elements connected to it increases.

Only two types of quantum channels are known today, phonons in ion traps and photons in optical cavities. Both channels display this above-mentioned limiting behavior.

In the trap phonon model, the data transmission rate must be substantially less than the trap phonon frequency. This is because the width of the laser pulses which couple the ions to the phonon is limited by the Fourier Theorem. If the pulses are too short, the Fourier spectrum of the pulse will excite several phonon levels at once and destroy the integrity of the channel. Typical phonon frequencies for single ions in linear ion traps range from about 10 KHz to 100 KHz, and the fundamental computer clock rate can be no greater than this. Moreover, as mentioned above, the phonon frequency is inversely proportional to the square root of the number of ions in the trap. Since useful computers are expected to require 1000 to 10,000 ions, the fundamental clock rate will be less than 1 KHz. Note that this is about 5 orders of magnitude slower than current silicon microprocessors.

A similar effect occurs for cavity photon channels. In this case, data transmission speeds are on the order of 1 MHz, but a similar reduction of the data rate with number of atoms occurs here. The limiting speed of this method is governed by a parameter called the "vacuum Rabi frequency", which is inversely proportional to the square root of the cavity mode volume (Phys. Rev. Lett. 75, 3788, 1995). For a long thin cavity mode, this volume will be proportional to the number of atoms inside, which leads to the same dependence on the inverse square root as in the ion trap case. Thus we expect, from the only quantum channels so far investigated, that channels which connect the fewest atoms will be the fastest.

As a result, the governing principle of quantum architecture is that many short quantum channels will be better than one large one. Note that the architecture of the Cirac-Zoller computer shown in FIG. 4 violates this principle maximally. The challenge of quantum architecture is to arrange these short channels in ways that optimize a given computing problem. This is the goal which is accomplished by the invention.

Detailed Descriptions of Preferred Architectures According to the Invention

The preferred architectures, according to the invention, have in common that they present quantum element structures which deal with a small number of quantum elements (such as trapped ions). In general, "small," in practice, preferably means about 2 to 20 quantum elements. By contrast, the above-discussed conventional quantum computer architectures, employing on the order of 1000 quantum elements, fall outside the range of what is considered "small" for the purpose of this invention. Note, however, that conventional quantum computers, which employ only a single quantum channel, must include within that channel a sufficient number of quantum elements to provide adequate computing power. By contrast, the invention employs multiple channels, thereby allowing for the use of a small number of quantum elements per channel, while still providing advantageous overall computing power.

Figure 7:
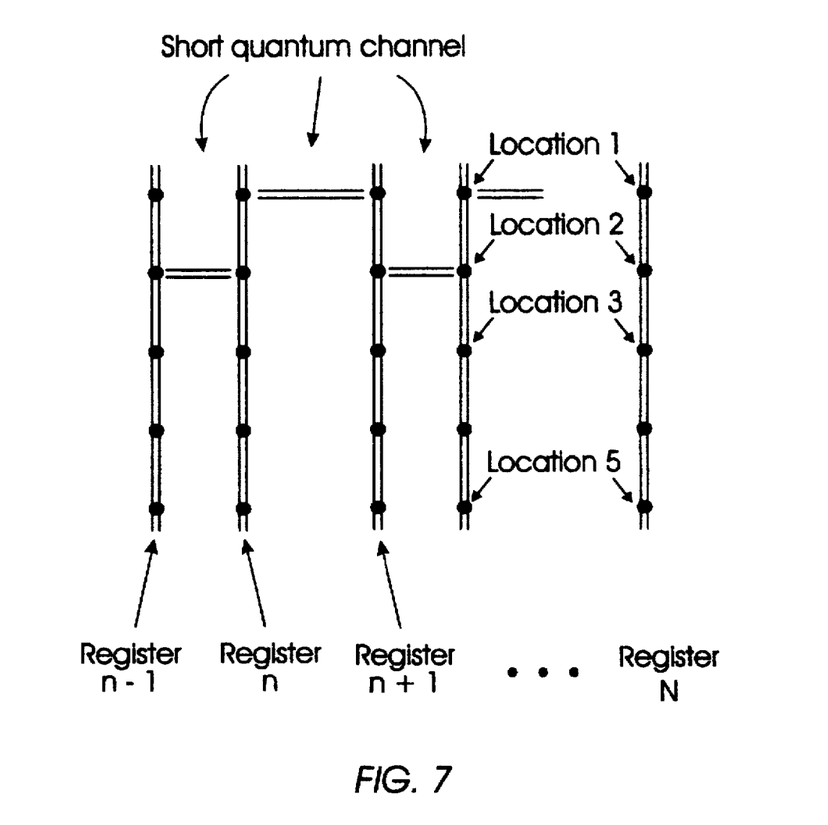
FIG. 7 shows the architecture of the first basic parallel quantum architecture in which many registers are connected by short channels.

The first parallel architecture is diagramed in FIG. 7, which shows a series of small quantum channels, called "registers". Each such register communicates between a small number K of quantum logic/memory elements, typically 2 to 20. The registers are preferably disposed substantially parallel to each other, as shown, so that neighboring or corresponding elements of different registers line up, or otherwise correspond, with each other.

In quantum computing, logic and memory are performed by the same physical object. Each logic/memory element connected to a register is called a "location". In a typical case, a quantum computer designed to process N-bit quantum words would contain N separate registers, with one register assigned to all the logic and memory functions for a given bit n of the N-bit quantum word. Thus, the n-th register contains up to K different locations for storing the n-th bit of K different quantum words. Each location acts like a different quantum memory element, so that an entire N-bit quantum word can be moved from one storage location to another in a single parallel operation.

Each register is connected to its nearest neighbors on the right and left by short "carry" channels, which connect a location of one register to that of another. This permits quantum information to be transferred from register to register, for example, to propagate the carry bit in a binary addition.

Figure 8:
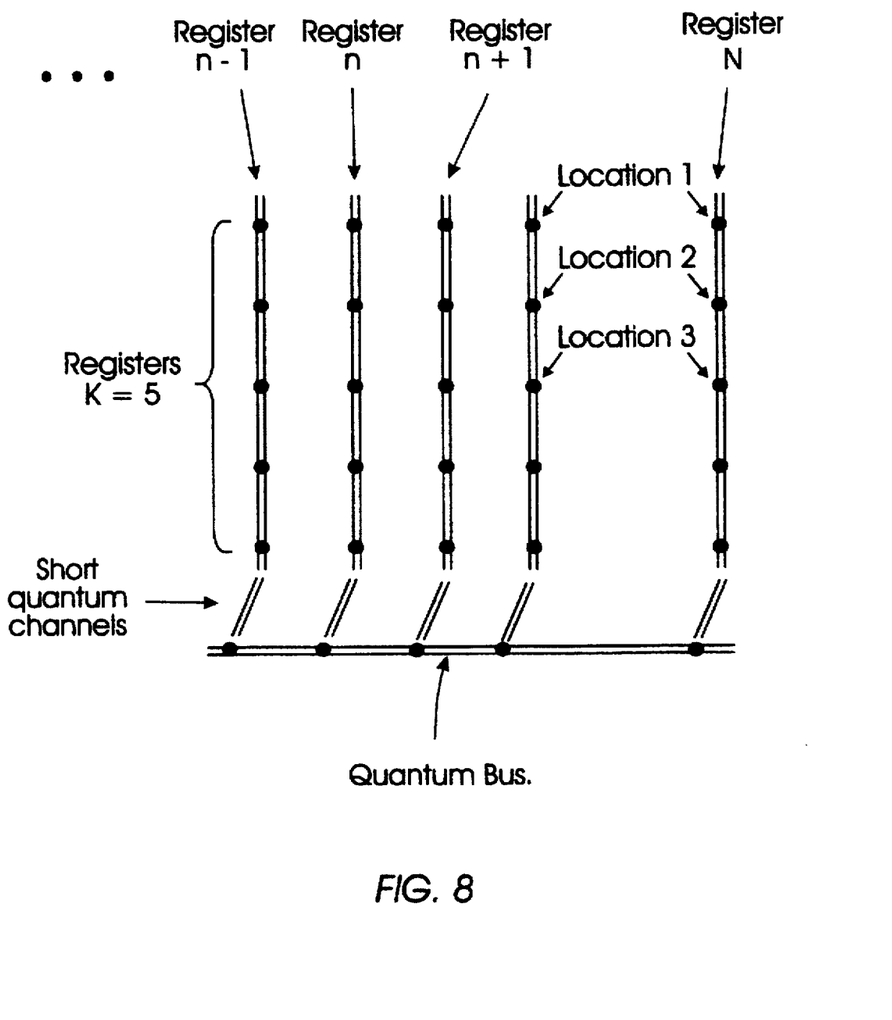
FIG. 8 shows the second basic parallel quantum architecture in which the registers are connected to one quantum bus.

The second parallel architecture is diagramed in FIG. 8, which shows a series of small quantum channels, called "registers", each of which communicates between a small number K of quantum logic/memory elements, typically 2 to 20. Each register is connected by a small 2-bit channel to a large quantum channel called a quantum bus, which, for the case of an N-bit quantum word, will communicate between all N quantum bits. The bus therefore communicates between any two registers with the same speed regardless of whether they represent low-order or high-order bits. Because this channel connects many registers, however, it will be technically complex, expensive, and will have a slower quantum data transfer rate than the short channels of the first architecture. However, there are certain kinds of logical and arithmetic operations which require communication between low-order and high order bits.

Figure 9:
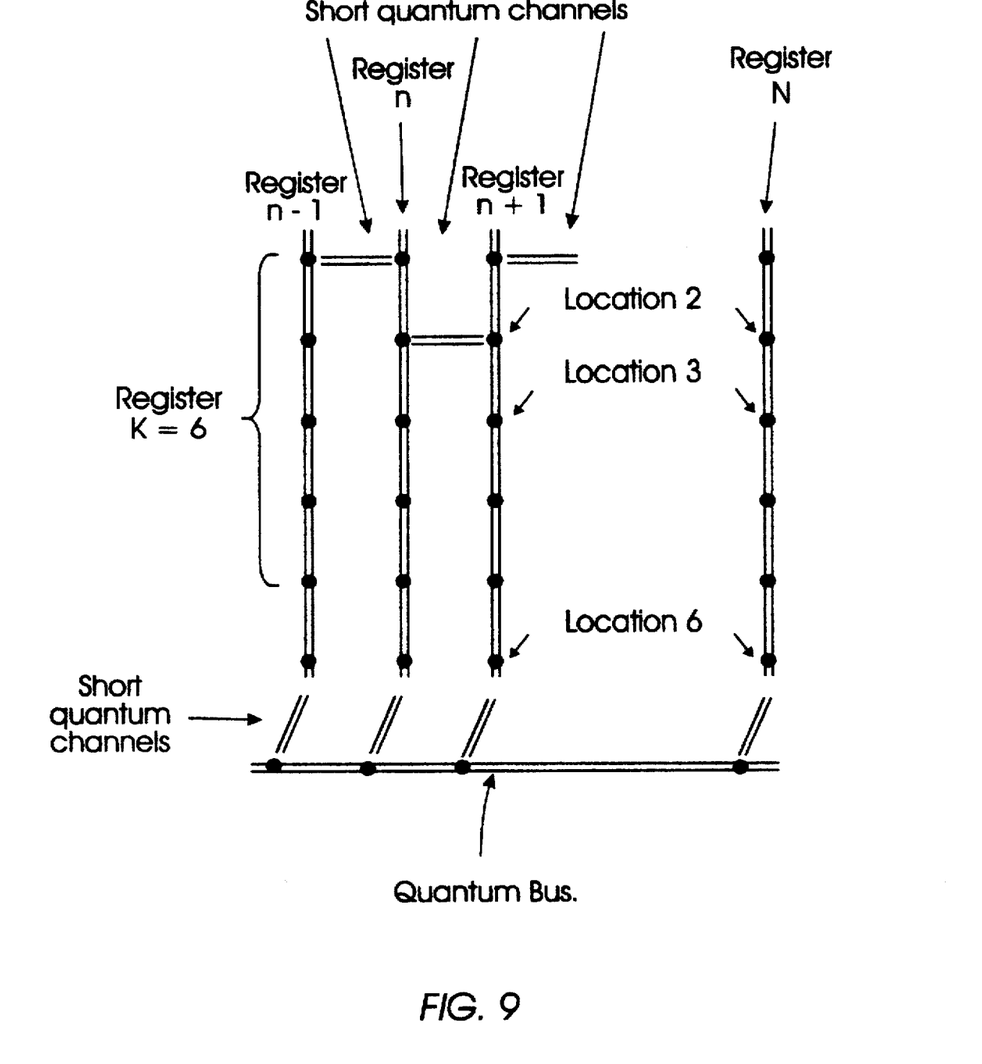
FIG. 9 shows the third basic parallel quantum architecture in which the registers are connected separately together by short channels and also to a quantum bus.

The third parallel architecture is diagramed in FIG. 9, which shows a series of small quantum channels, called "registers", each of which communicates between a small number K of quantum logic/memory elements, typically 2 to 20. Each register is connected both to its nearest neighbors on the right and left by short "carry" channels, and also to a large quantum channel called a quantum bus by a small 2-bit channel. This architecture, while more complex technically, combines the advantages of the first and second architectures without penalty. It provides short, high speed quantum channels for frequent communication between neighboring bits, and further provides one slow channel for infrequent, but more complex, coupling between low and high order bits.

Figure 10:
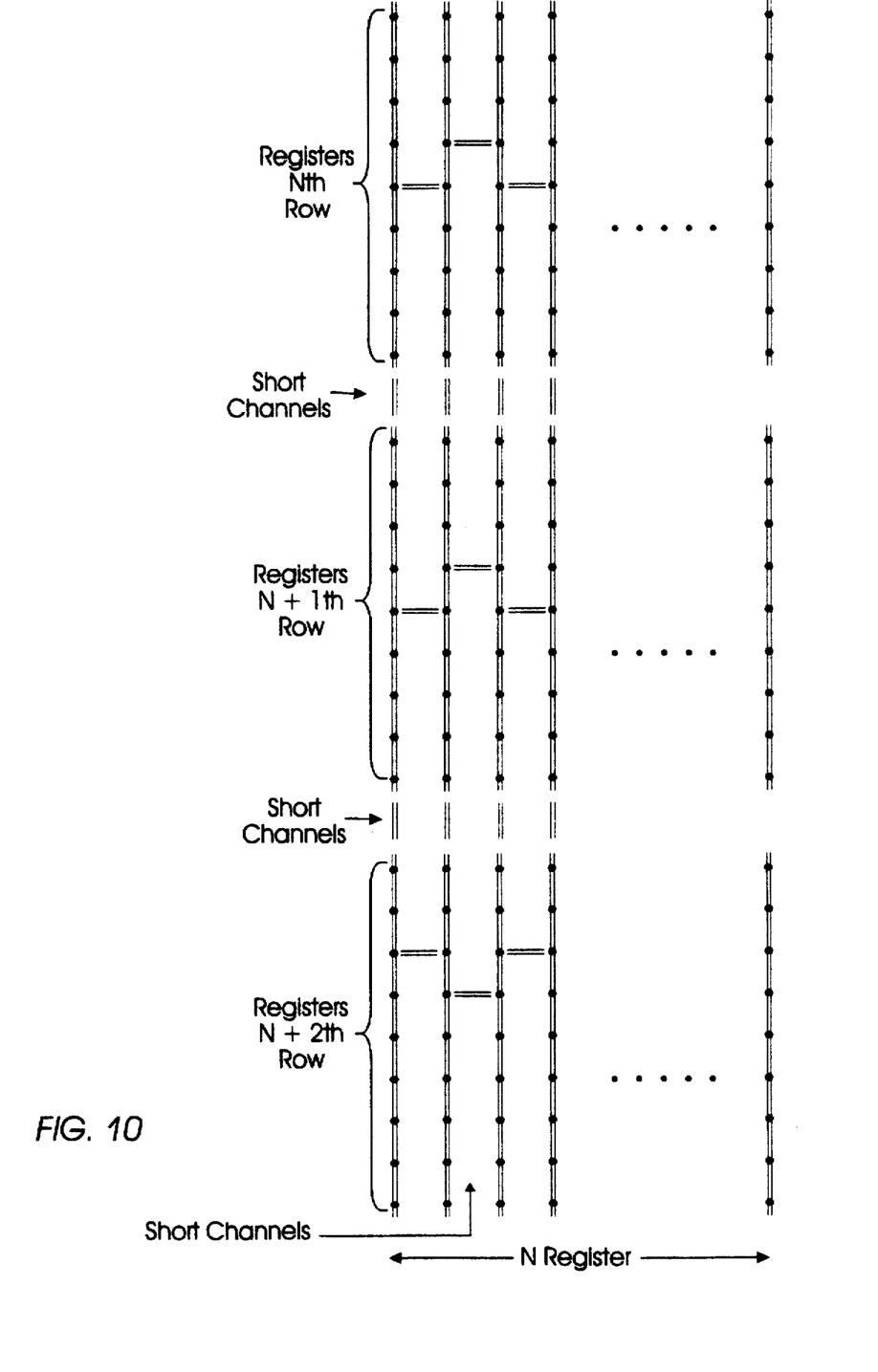
FIG. 10 shows the fourth basic parallel quantum architecture in which there are L rows of registers, each of which is connected to its four nearest neighbors in 2 dimensions by short channels.

The fourth parallel architecture is shown in FIG. 10, and includes a two-dimensional array of small quantum channels, called "registers", each of which communicates between a small number K of quantum logic/memory elements, typically 2 to 20. Each register is connected both to its nearest neighbors on the right and left by short "carry" channels, and is also connected to the register immediately above and below it, by short carry channels.

Many variations on this architecture are apparent to those skilled in the art. For example, for certain applications, the quantum bus might connect only a subset of the N-bits. It is also assumed that, for certain applications, the short carry channels might not connect to a nearest neighbor, but rather to a second nearest neighbor, and so on.

The first basic planar configuration is a one-hole trap which comprises three parallel, electrically conductive sheets separated by dielectrics disposed on the outer edges of said sheets, the inner sheet having an elliptical hole. The one-hole trap further has a means to apply an RF field between the center sheet and the two outer sheets such that the resulting electric field being generated in the space defined by the elliptical hole and the two outer sheets has a characteristic of a substantially quadrupole field, whereby a charged particle in being injected into the space is confined in said field, maintaining a dynamic equilibrium condition.

The second basic planar configuration is a three-hole trap which comprises three parallel, electrically conductive sheets separated by dielectrics disposed on the outer edges of said sheets, each of the three sheets having elliptical holes and said elliptical holes are symmetrically aligned substantially along a common axis. The three hole trap further has a means to apply an RF field between the center sheet and the two outer sheets such that the resulting electric field being generated in the space defined by the three aligned elliptical holes has a characteristic of a substantially quadrupole field, whereby a charged particle in being injected into the space is confined in said field, maintaining a dynamic equilibrium condition.

The third basic planar configuration is a concentric-ring trap which comprises an outer elliptical ring and at least one inner elliptical ring made of electrically conductive material disposed on a same plane, these multiple rings being symmetrically aligned substantially along a common axis. The concentric ring trap further has a means for impressing an RF potential in between any two rings. A resulting electric field is generated in a region above the plane of the multiple rings having a characteristic of a substantially quadrupole field, whereby a charged particle in being injected into the space floats above the rings and is confined in said field, maintaining a dynamic equilibrium condition.

The fourth basic planar configuration is a three-ring trap which comprises two outer elliptical rings and an inner elliptical ring made of electrically conductive material disposed on three substantially parallel planes, said three rings being symmetrically aligned substantially along a common axis. The three-ring trap also has a means for impressing an RF potential between the inner ring and the two outer rings. Furthermore, the two outer rings have radii of the same length, the inner ring has a greater radius, and the outer rings are maintained at the same distance from the inner ring. The spacing between the rings is adjusted as a function of the radii of the outer rings and the inner rings such that the resulting electric field being generated in the space defined by the three aligned rings has a characteristic of a substantially quadrupole field up to a high harmonic order, whereby a charged particle in being injected into the space is confined in said field, maintaining a dynamic equilibrium condition.

The fifth basic planar configuration is a two-ring trap which comprises two elliptical rings made of electrically conductive material disposed on two substantially parallel planes, said two rings being symmetrically aligned substantially along a common axis. The two-ring trap also has a means for impressing an RF potential between the two rings, which are electrically connected together so that they are at the same potential, and a distant ground electrode, whose shape is not critical. Furthermore, the two outer elliptical rings have radii of the same length. The spacing between the rings is adjusted as a function of the radii of the rings such that the resulting electric field being generated in the space between the rings has the characteristic of a substantially quadrupole field up to a high harmonic order, whereby a charged particle in being injected into the space is confined in said field, maintaining a dynamic equilibrium condition.

The sixth basic planar configuration is a four-ring trap which comprises two outer elliptical rings and two inner elliptical rings made of electrically conductive material disposed on four substantially parallel planes, said four rings being symmetrically aligned substantially along a common axis. The four-ring trap also has a means for impressing an RF potential between the two inner rings, which electrically connected together so that they are at the same potential, and the two outer rings, which are also electrically connected together so that they are at the same potential. Furthermore, the two inner rings have radii of the same length and the two outer rings have radii of the same length. The spacing and radii of the inner and outer rings is adjusted such that the resulting electric field being generated in the space between the rings has the characteristic of a substantially quadrupole field up to a high harmonic order, whereby a charged particle in being injected into the space is confined in said field, maintaining a dynamic equilibrium condition.

The seventh basic planar configuration is a two-hole trap which comprises two parallel, electrically conductive sheets, each sheet having an elliptical hole, the elliptical holes being symmetrically aligned substantially along a common axis. The sheets may be separated by dielectrics disposed on the outer edges of the sheets. The two-hole trap also has a means for impressing an RF potential between the two sheets, which are electrically connected together so that they are at the same potential, and a distant ground, whose shape is not critical. The spacing between the two sheets is adjusted as a function of the radii of the holes such that the electric field being generated in the space between the holes has the characteristic of a substantially quadrupole field up to a high harmonic order, whereby a charged particle in being injected into the space is confined in said field, maintaining a dynamic equilibrium condition.

The eighth basic planar configuration is a four-hole trap which comprises four parallel, electrically conductive sheets, each sheet having an elliptical hole, the elliptical holes being symmetrically aligned substantially along a common axis. The inner holes are of substantially the same radius and the two outer holes are also of substantially the same radius. The sheets may be separated by dielectric disposed on the outer edges of the sheets. The four hole trap also has a means for impressing an RF potential between the two inner sheets, which are electrically connected together so that they are at the same potential, and the two outer sheets, which are also electrically connected together so that they are at the same potential. The spacing between the sheets is adjusted as a function of the radii of the holes such that the electric field being generated in the space between the inner holes has the characteristic of a substantially quadrupole field up to a high harmonic order, whereby a charged particle in being injected into the space is confined in said field, maintaining a dynamic equilibrium condition.

The four architectures of this patent carry out this goal in several different ways. In general, they provide one register for each bit of a quantum word. Within each register, there are K locations for storage and logic. This permits parallel storage and retrieval of long quantum words. Shor's algorithm typically uses quantum words several hundred bits long, so in this case there would be several hundred registers connected as in FIGS. 7–10. The K locations in each register can used for different purposes, for example, for storage of intermediate results and as locations for the auxiliary bits required for quantum error correction (Phys Rev. Lett. 77, 2585, 1996). The first 3 architectures contain a single row of registers, one register for each bit of a quantum word but differ in their coupling between adjacent registers. The first architecture, called the nearest neighbor model, contains a channel coupling one location of one register to one location of the nearest neighbor to the right and to the left. Since this coupling channel is contains only two logic/memory elements, it will be advantageously fast. Since the registers contain less than about 20 logic/memory elements, they will also be fast.

This architecture is suited for problems such as repeated additions from the K locations, where the carry bit is propagated by the nearest neighbor channel. The second architecture couples all of the registers to one long quantum channel called the quantum bus. Since the bus must contain at least N logic/memory elements, it will be relatively slow. However it will still be faster than the Cirac-Zoller model, which requires 5N+1 logic/memory elements for an N bit quantum word. The additional 4N+1 elements are used for temporary storage and as ancillary bits for making the calculation unitary and reversible ( Phys. Rev. A54, 1034, 1996).

This architecture is optimized for operations involving high-order and low-order bits, for example, the bit reversal operation which is part of the Fast Fourier transform required for Shor's algorithm (Rev. Mod. Phys. 68, 733, 1996).

The third architecture is a straightforward combination of the first and second architectures in which separate locations are provided for coupling both to nearest neighbors and to a quantum bus. This combination is more complex to realize, but the two couplings do not interfere with each other, so that short and long channels can be used as needed.

Those skilled in the art will also recognize many variations on these architectures. For example, the quantum bus might be broken up into sub-busses connecting certain groups of bits to optimize certain calculations. Alternatively, there may be arrangements in which one register might represent two quantum bits.

The fourth basic architecture is a two-dimensional array of registers, each connected by nearest neighbor links, both the right and the left and from top to bottom. Each of the links connects only two logic/memory elements in each register, so they will be fast.

While the most technically complex, this architecture permits the execution of fast parallel algorithms for multiplication as in conventional computers. See "Computer Architecture: A Quantitative Approach", Hennessy and Patterson, Morgan-Kaufmann, San Francisco, 1996. Such algorithms increase computer speed by factors of greater than sqrt(N), where N is the number of bits. For a 500-bit computer, this is a 20-fold increase in speed.

The novelty of the invention is that it is the first and only quantum computer design to permit parallel algorithms and computation.

Physical Realizations of the Architectures

Figure 11:
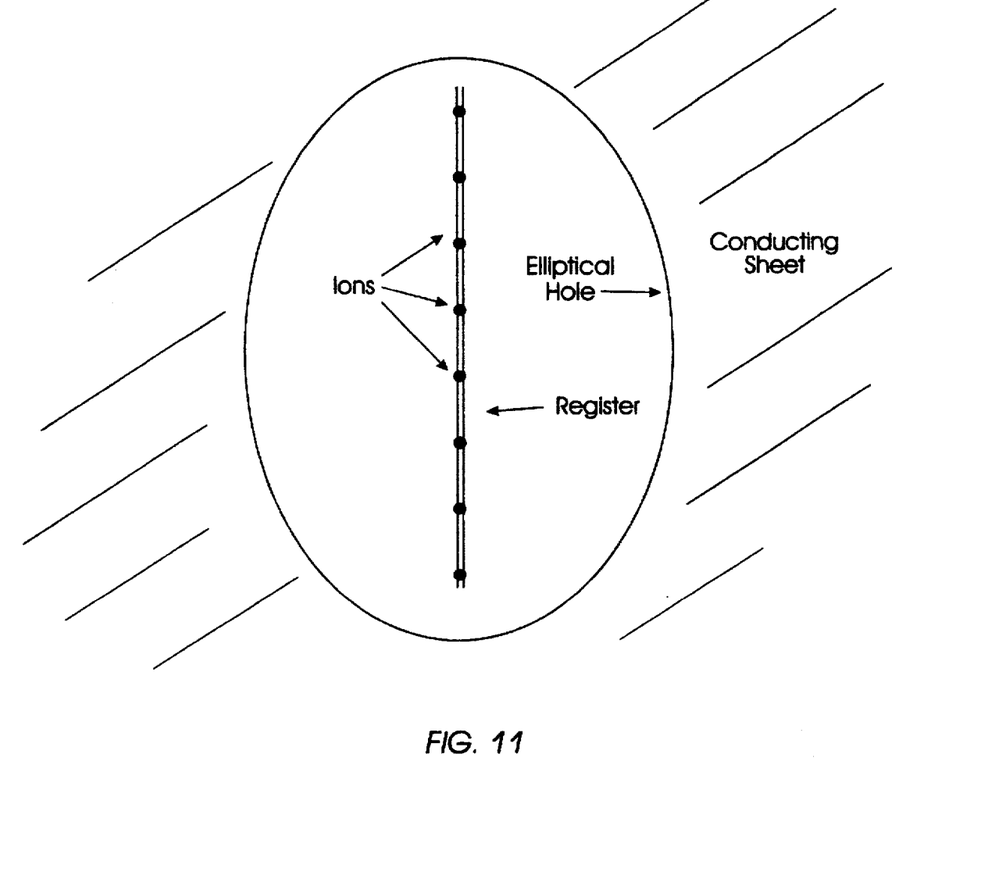
FIG. 11 shows the first basic elliptical planar ion trap which traps K ions to embody one register.
Figure 12:
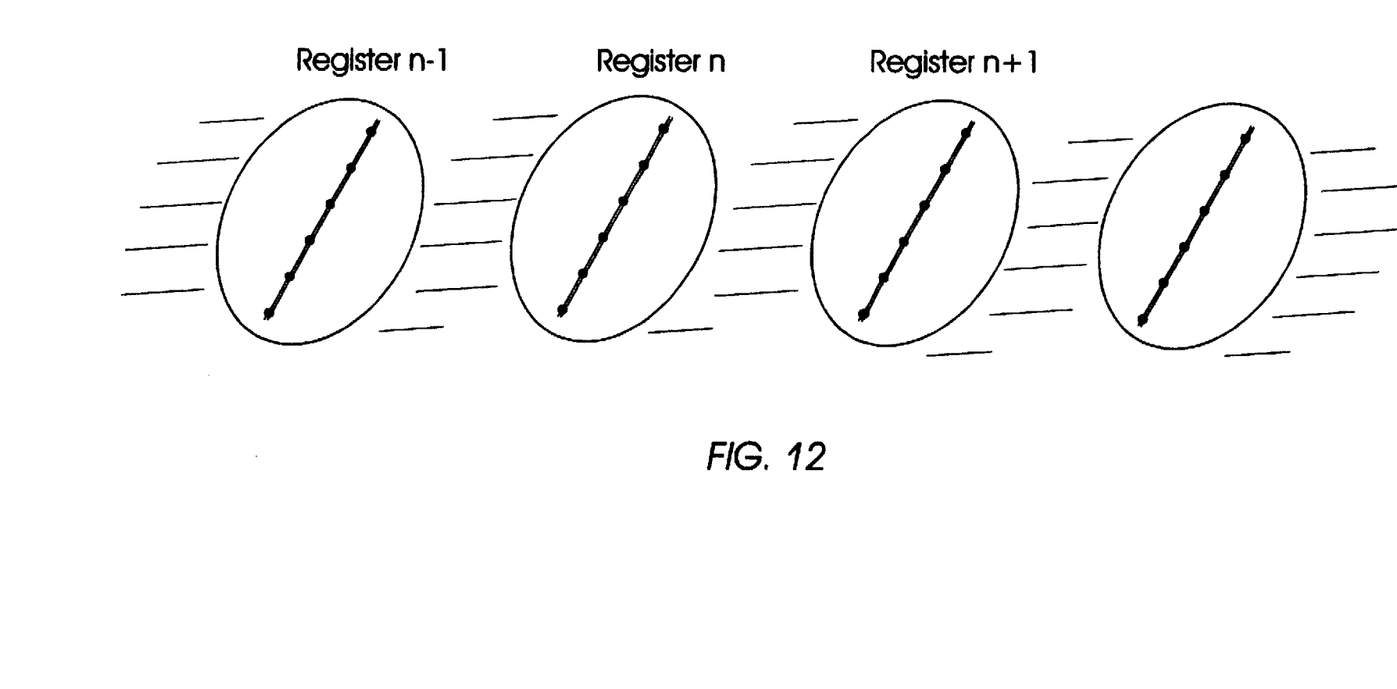
FIG. 12 shows an array of elliptical planar ion traps where each trap represents one bit of a long quantum word.

These architectures can be realized with novel elliptical planar ion traps shown in FIG. 11. The traps are constructed from a single flat conducting sheet in which elliptical holes have been microfabricated by photolithography. This produces an electric field within the aperture of substantially quadrupole form which confines charged particles in a condition of electrodynamic equilibrium. Each trap performs the function of a linear ion trap, but is smaller, has higher phonon frequencies for faster computation speeds, and can economically be constructed in large linear arrays for architectures 1-3 and in two dimensional arrays for architecture 4. Each trap embodies one register and each trapped ion corresponds to one location. The trap phonon acts as the quantum communications channel within the register and additional devices, employing either phonons or photons, are used as the short coupling channels between registers.

The preferred embodiment of the elliptical planar trap has major axes of 300 microns diameter and minor axes of 200 microns diameter, which are chosen to be consistent with prototypes whose working properties are well known. The axes of traps in an array are parallel to each other and the distances from trap center to trap center are approximately 500 microns, giving a linear density of 50 traps per inch. All the traps are constructed in a single photolithographic process so that a row of 400 traps can be fabricated along the diameter of a single 8 inch silicon wafer, leaving room for auxiliary classical and quantum circuitry. For simplicity, the trap design uses only a single conducting sheet, and is an elliptical modification of the first basic planar configuration of U.S. Pat. Nos. 5,248,883 and 5,379,000, although other configurations could also be used.

The elliptical planar trap provides the same function as a linear trap and produces strong trap forces along two axes and weak forces along the third axis, on which laser-cooled ions condense in a long row. To achieve this goal with our planar design, which previously used only circular apertures, we elongate one axis of the circle to form an ellipse. The electric field will now be weaker along this axis because the same potential drop now occurs across a greater distance. The major axis of the ellipse becomes the weak axis along which a row of ions will condense. No detailed calculation of the field distribution in an elliptical hole has yet been carried out and it is not known whether another shape might provide a quadrupole field with fewer higher order terms. However, approximately elliptical traps have been constructed and laser-cooled barium ions have been observed to condense in a row on the major axis. This has occurred in imperfectly machined prototype planar traps where, for example, a hole intended to be circular in shape with a radius of 100 microns, was in fact constructed with approximately elliptical shape with 80 and 100 micron minor and major radii. To construct a trap capable of holding up to 20 ions it is necessary to design an elliptical trap of greater eccentricity, for example, a 1.5 to 1 ratio of major and minor axes, and to microfabricate the aperture with greater precision. This is well within the art since typical tolerances for photolithography are well below 1 micron, which is less than 1% of the trap radius The 200 by 300 micron diameters of the preferred trap design were chosen to be similar to those of current operating circular devices, which have been used for research in quantum electrodynamics ( Phys. Rev. Lett. 76, 2049, 1996) as well in the first quantum logic gate experiment ( Phys. Rev. Lett. 75, 4714, 1995). The phonon frequencies in these traps have been measured to be about 5-10 MHz, from which one can reliably calculate elliptical trap phonon frequencies of about 1 MHz. Note that this is a factor of 10 to 100 higher than for previous linear ion traps, which permits quantum computation this much faster.

The quantum channels for coupling between registers can be realized either by phonons or by photons. The photon coupling is preferable, because of a greater channel speed.

Figure 13:
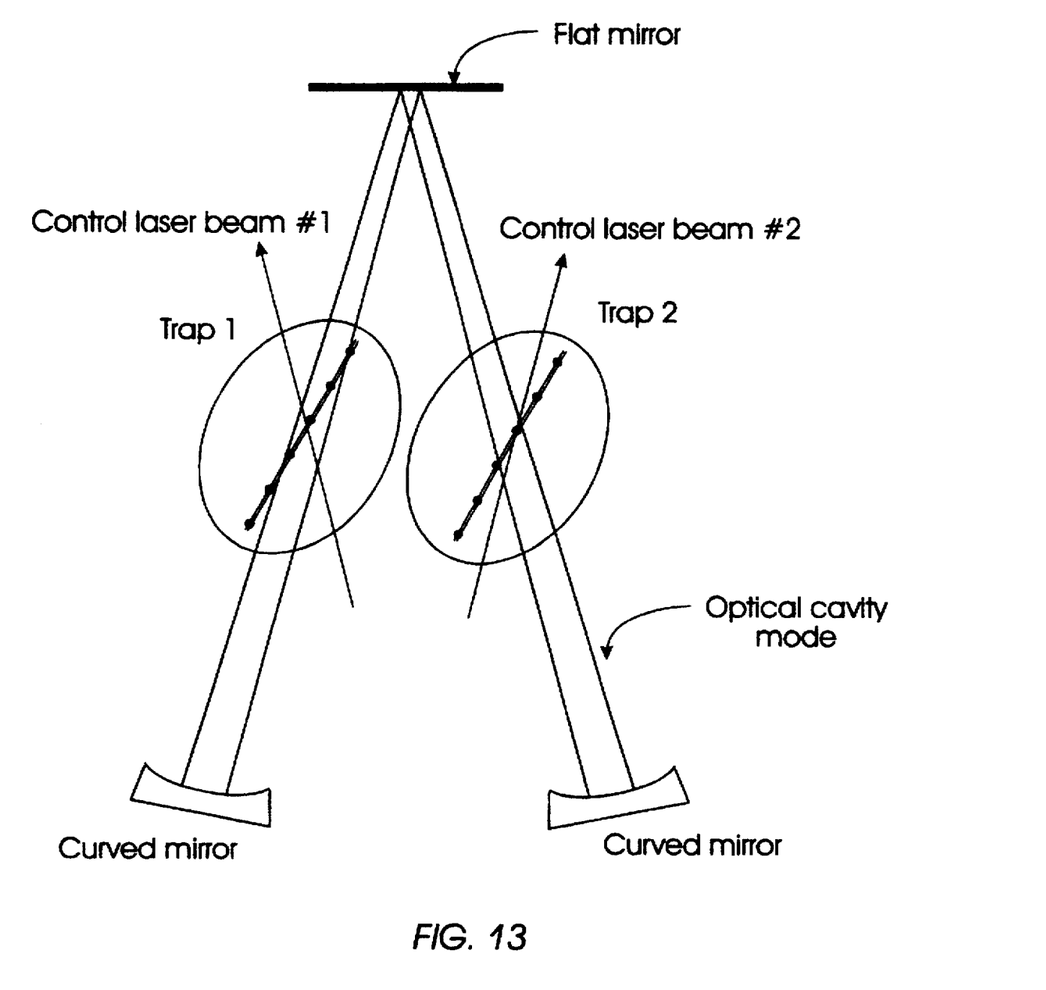
FIG. 13 shows two elliptical planar ion traps and a three-mirror optical resonant cavity which forms a communications channel for transmitting quantum information from one trap to the other.

The photon coupling preferably uses an architecture similar to that of the prior art shown in FIG. 5. An optical cavity is constructed, having a resonant optical mode which overlaps two ions belonging to different elliptical traps. This can be accomplished physically in several different geometries. The simplest is the 3-mirror arrangement of FIG. 13, containing two concave mirrors below the plane of the traps and one flat mirror above. The concave mirrors create a gaussian mode in the cavity. Their radii of curvature are chosen to produce a spot size at the ions of several microns, significantly less than the ion—ion spacing, so that only 1 ion in each trap is illuminated.

Each ion of the coupled pair is also illuminated by a control laser beam, as in FIG. 6. When a certain temporally overlapping pulse shape is applied to the two control laser beams, the wavefunctions of ions 1 and 2 will be interchanged, forming a quantum communication channel, as discussed above and in the literature. The small trap sizes possible with microfabricated planar traps permits small spacing of the mirrors which leads to a small mode volume. Mode diameters of about 5 microns and mirror spacings of 1 mm lead to mode volumes<30 microns$^3$. This is small enough to ensure "vacuum Rabi frequencies">1 MHz, which as noted above, yield data transfer rates of this order.

The novelty of the invention consists, first, of the use of many small ion traps in a parallel architecture, as contrasted to the above-discussed prior art which uses one large ion trap in a serial architecture. A quantum computer in accordance with the invention preferably uses one ion trap per quantum bit, and employs several hundred or more traps for a whole computer. Second, the architecture according to the invention is made practical by the invention of microfabricated arrays of elliptical ion traps. This microfabrication permits the manufacture of hundreds of traps more efficiently that the construction by hand of a single linear ion trap. Third, quantum information is transferred between ion traps using an optical coupling. This coupling is possible only due to the small size of the microfabricated traps. Conventional ion traps are so large by comparison, with dimensions in the millimeter range, that their optical cavity quantum channels become inefficient and lose quantum information, creating computer errors.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A quantum computing apparatus comprising:
   (a) a plurality of short quantum channels in parallel array, each channel trapping a predetermined number of ions as quantum computable elements in oblong or elliptically shaped apertures;
   (b) a plurality of optical paths coupling quantum computable elements in selective ones of the channels;
   (c) an arrangement for selectively and concurrently illuminating ones of the channels and the optical paths with patterns of coded monochromatic light, said coded light quantum mechanically engaging the computable elements and altering their logical information state, predetermined ones of the coded light patterns transferring indicia of logical states and partial or completed computations among computable elements in the channels and through the optical paths; and
   (d) an arrangement for sensing said indicia emanating from computable elements in selective ones of said channels and optical paths.

2. The quantum computing apparatus according to claim 1, wherein each of the quantum channels being formed from a one-hole ion trap comprising:
   (a1) a single electrically conductive sheet having an oblong or elliptical hole; and
   (a2) a circuit for applying an RF field to the sheet such that the resulting electric field is projected in the space defined by the oblong or elliptical hole and the sheet operative as a substantially quadrupole field,
   whereby a charged particle in being injected into the space is confined in said field, thereby maintaining a dynamic equilibrium condition.

3. The quantum computing apparatus according to claim 1, wherein each of the quantum channels being formed from a three-hole ion trap comprising:
   (a1) at least three parallel, electrically conductive sheets separated by dielectrics disposed on the outer edges of said sheets, each of the three sheets having oblong or elliptical holes, said oblong or elliptical holes being symmetrically aligned substantially along a common axis; and
   (a2) a circuit for applying an RF field between the center sheet and the two outer sheets such that the resulting electric field is projected in the space defined by the three aligned oblong or elliptical holes as a substantially quadrupole field,
   whereby a charged particle in being injected into the space is confined in said field, thereby maintaining a dynamic equilibrium condition.

4. The quantum computing apparatus according to claim 1, wherein each of the quantum channels being formed from a concentric ring ion trap comprising:
   (a1) an oblong or elliptical ring made of electrically conductive material; and
   (a2) a circuit for impressing an RF potential on the ring such that the resulting electric field is projected in a region above the plane of the ring as a substantially quadrupole field,
   whereby a charged particle in being injected into the space floats above the ring and is confined in said field, thereby maintaining a dynamic equilibrium condition.

5. The quantum computing apparatus according to claim 1, wherein each of the quantum channels being formed from a multiple ring ion trap comprising:
   (a1) at least two outer oblong or elliptical rings and an inner oblong or elliptical ring made of electrically conductive material disposed on three substantially parallel planes, said three rings being symmetrically aligned substantially along a common axis; and
   (a2) a circuit for impressing an RF potential between the inner ring and the two outer rings, said two outer rings having radii of the same length, said inner ring having a radius exceeding that of each of the outer rings, said spacing between the rings being adjusted as a function of the radii of the outer rings and the inner rings such that the resulting electric field is projected in the space defined by the three aligned rings as a substantially quadrupole field up to a high harmonic order,
   whereby a charged particle in being injected into the space is confined in said field, thereby maintaining a dynamic equilibrium condition.

6. A quantum computing apparatus comprising:
   (a) a plurality of short quantum channels in parallel array, each channel trapping a predetermined number of ions as quantum computable elements, the channels being selected from a set consisting of at least one oblong or elliptically apertured ion trap and a multiple concentric oblong or elliptical ring ion trap;
   (b) a plurality of optical paths coupling quantum computable elements in selective ones of the channels;
   (c) an arrangement for selectively and concurrently illuminating ones of the channels and the optical paths with patterns of coded monochromatic light, said coded light quantum mechanically engaging the computable elements and altering their logical information state, predetermined ones of the coded light patterns transferring indicia of logical states and partial or completed computations among computable elements in the channels and through the optical paths; and
   (d) an arrangement for sensing said indicia emanating from computable elements in selective ones of said channels and optical paths.

7. The quantum computing apparatus according to claim 6, wherein the ellipticity of the oblong or elliptically apertured ion trap lies substantially in the range between 2 to 5.

8. The quantum computing apparatus according to claim 6, wherein each of the quantum channels and their counterpart ion traps lies in a plane, and further wherein each of the optical paths is formed from a resonant optical cavity overlapping a pair of ions belonging to distinguishable oblong or elliptical ion traps, said cavity comprising a pair of concave mirrors below the plane of the traps and a flat mirror above the plane of the traps.

9. The quantum computing apparatus according to claim 8, wherein the radii of curvature of the concave mirrors being selected to produce a spot size at the ions when said mirrors are appropriately directed significantly less than the ion-to-ion spacing so that only one ion in each trap is illuminated.

10. The quantum computing apparatus according to claim 6, wherein the plurality of quantum channels is of such number as to effectuate a ratio of one ion trap per unit of logical information.

11. A quantum computing apparatus comprising:
   (a) N short quantum channels in parallel array, each channel trapping K ions as quantum computable elements, the channels being selected from a set consisting of at least one oblong or elliptically apertured ion trap and a multiple concentric oblong or elliptical ring ion trap;

(b) a plurality of optical paths coupling quantum computable elements in selective ones of the channels, the ends of each of the optical paths terminating in its nearest neighbor quantum channel such that each optical path is operable to propagate logical indicia from one quantum channel to another;

(c) an arrangement for selectively and concurrently illuminating ones of the channels and the optical paths with patterns of coded monochromatic light, said coded light quantum mechanically engaging the computable elements and altering their logical information state, predetermined ones of the coded light patterns transferring indicia of logical states and partial or completed computations among computable elements in the channels and through the optical paths; and (d) an arrangement for sensing said indicia emanating from computable elements in selective ones of said channels and optical paths.

12. The quantum computing arrangement according to claim 11, wherein:

each of the quantum channels and their counterpart ion traps lie in a plane;

each of the optical paths is formed from a resonant optical cavity overlapping a pair of ions as computable elements belonging to distinguishable oblong or elliptical ion traps, said cavity comprising a pair of concave mirrors below the plane of the traps and a flat mirror above the plane of the traps, the radii of curvature of the concave mirrors in said cavity being selected to produce a spot size at the ions when said mirrors are appropriately directed significantly less than the ion-to-ion spacing so that only one ion in each trap is illuminated; and said arrangement for selectively illuminating ones of the channels and paths being geometrically disposed in relation to said mirrors for selectively illuminating each ion of a coupled pair, and in the event that a predetermined coded pattern of illumination is applied, the wave functions of ions of the pair in the optical cavity are interchanged forming a quantum communication channel.

13. The quantum computing arrangement according to claim 11, wherein said arrangement includes means for causing the patterns of coded light quantum mechanically engaging the computable elements to perform a selectable one of the functions in the set of functions consisting of:

(c1) reading out the logical information state of a computable element;

(c2) executing a clear operation by setting one or more computable elements to a common predetermined reference state;

(c3) writing or changing the logical information state of a computable element that has been reset to a predetermined reference state; and (c4) causing an information indicia transfer from one computable element to another with which it is optically coupled.

* * * * *